(12) United States Patent
Kadoi

(10) Patent No.: US 12,526,527 B2
(45) Date of Patent: Jan. 13, 2026

(54) IMAGING DEVICE, METHOD FOR CONTROLLING IMAGING DEVICE AND NON-TRANSITORY COMPUTER-READABLE STORAGE MEDIUM WITH IMPROVING BRIGHTNESS THROUGH GRADATION CORRECTION

(71) Applicant: CANON KABUSHIKI KAISHA, Tokyo (JP)

(72) Inventor: Hideki Kadoi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 18/299,843

(22) Filed: Apr. 13, 2023

(65) Prior Publication Data

US 2023/0353880 A1 Nov. 2, 2023

(30) Foreign Application Priority Data

Apr. 27, 2022 (JP) .................................. 2022-073105

(51) Int. Cl.
*H04N 23/71* (2023.01)
*G06T 5/40* (2006.01)
(Continued)

(52) U.S. Cl.
CPC .............. *H04N 23/71* (2023.01); *G06T 5/40* (2013.01); *G06T 5/92* (2024.01); *H04N 23/76* (2023.01)

(58) Field of Classification Search
CPC ........ H04N 23/71; H04N 23/76; H04N 23/72; H04N 23/73; H04N 23/67; H04N 23/75; G06T 5/40; G06T 5/92
(Continued)

(56) References Cited

U.S. PATENT DOCUMENTS 6,694,051 B1  2/2004  Yamazoe
2002/0118019 A1*  8/2002  Nomura ............. H04N 1/00172
                                                                324/509
(Continued)

FOREIGN PATENT DOCUMENTS

JP     H05-056335 A     3/1993
JP     2000-036043 A    2/2000
(Continued)

OTHER PUBLICATIONS

Learning Multi-Scale Photo Exposure Correction, by Afifi, Mahmoud, Derpanis, Konstantinos G., Ommer, Björn, Brown, Michael S., ARXIV ID: 2003.11596, https://iq.ip.com/npl/arxiv/200311596?o=iq Mar. 25, 2020 (Year: 2020).*

(Continued)

*Primary Examiner* — Ping Y Hsieh
*Assistant Examiner* — Heath E. Wells
(74) *Attorney, Agent, or Firm* — Venable LLP

(57) ABSTRACT

An imaging device includes a setting unit configured to set a target brightness level of a high-brightness region in an imaging scene; an exposure control unit configured to perform photometry to control exposure; and a gradation correction unit configured to perform predetermined gradation correction on an image obtained by imaging, wherein a mode for controlling the exposure includes a first photometry mode, in which photometry is performed using the high-brightness region as a photometry region and exposure is controlled on a basis of a target brightness level set by the setting unit, and a second photometry mode different from the first photometry mode, and the gradation correction unit suppresses the predetermined gradation correction more in a case in which the image is obtained by imaging using the first photometry mode than in a case in which the image is obtained by imaging using the second photometry mode.

15 Claims, 13 Drawing Sheets

(51) Int. Cl.
*G06T 5/92* (2024.01)
*H04N 23/76* (2023.01)

(58) Field of Classification Search
USPC .......................................................... 382/274
See application file for complete search history.

(56) References Cited

U.S. PATENT DOCUMENTS

| | | | | |
|---|---|---|---|---|
| 2009/0040338 | A1* | 2/2009 | Muramatsu | G03B 7/09979 |
| | | | | 348/229.1 |
| 2009/0244329 | A1* | 10/2009 | Kuniba | G06T 5/92 |
| | | | | 348/241 |
| 2010/0123795 | A1 | 5/2010 | Ikeda | |
| 2014/0218416 | A1* | 8/2014 | Suzuki | G09G 5/10 |
| | | | | 345/690 |
| 2017/0116931 | A1* | 4/2017 | Matsui | G09G 3/36 |
| 2017/0374259 | A1* | 12/2017 | Nakamura | H04N 5/77 |
| 2021/0168265 | A1 | 6/2021 | Osuka | |
| 2021/0366435 | A1* | 11/2021 | Abe | G09G 5/10 |

FOREIGN PATENT DOCUMENTS

| | | |
|---|---|---|
| JP | 2010-273007 A | 12/2010 |
| JP | 2015166767 A * | 9/2015 |

OTHER PUBLICATIONS

Sep. 12, 2023 European Official Action in European Patent Appln. No. 23165885.7.

* cited by examiner

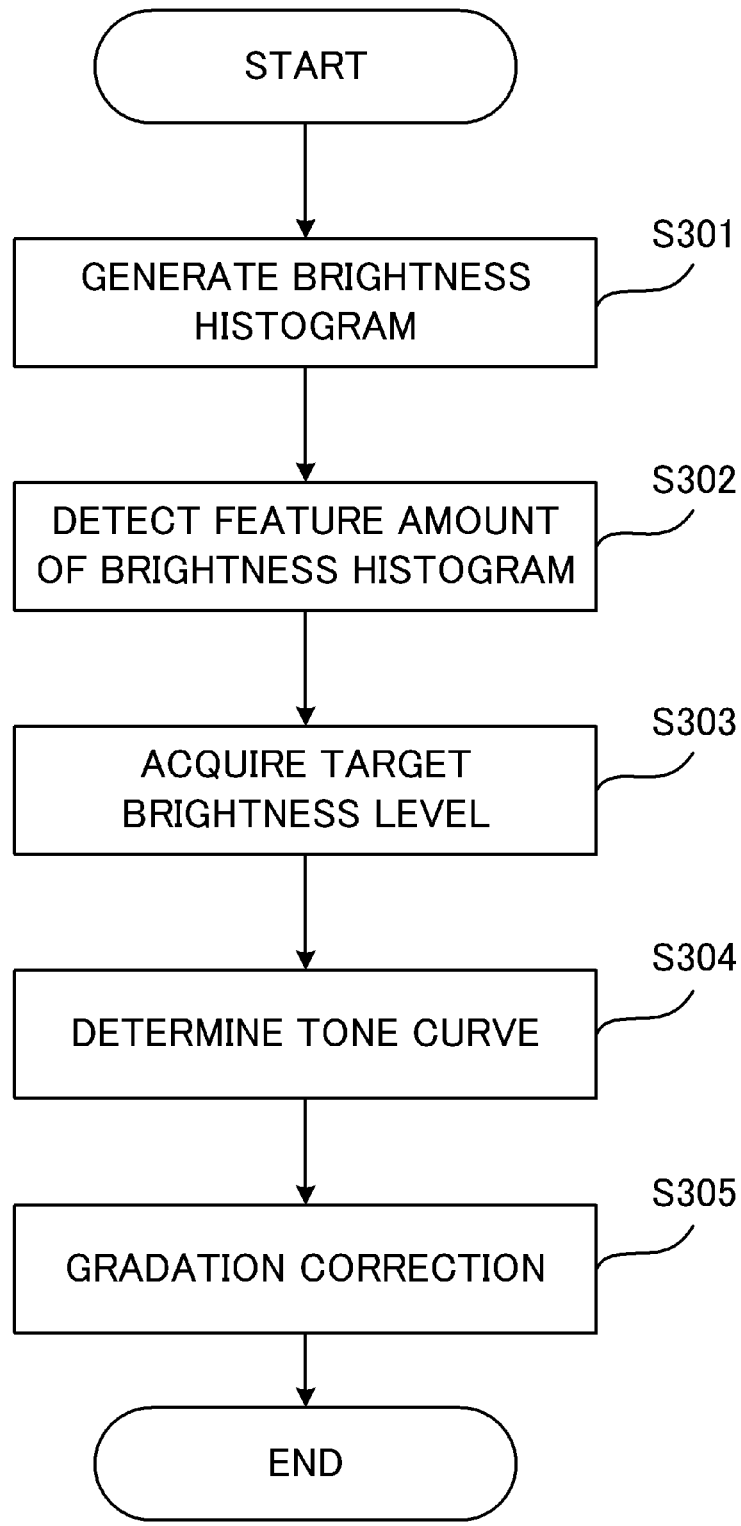

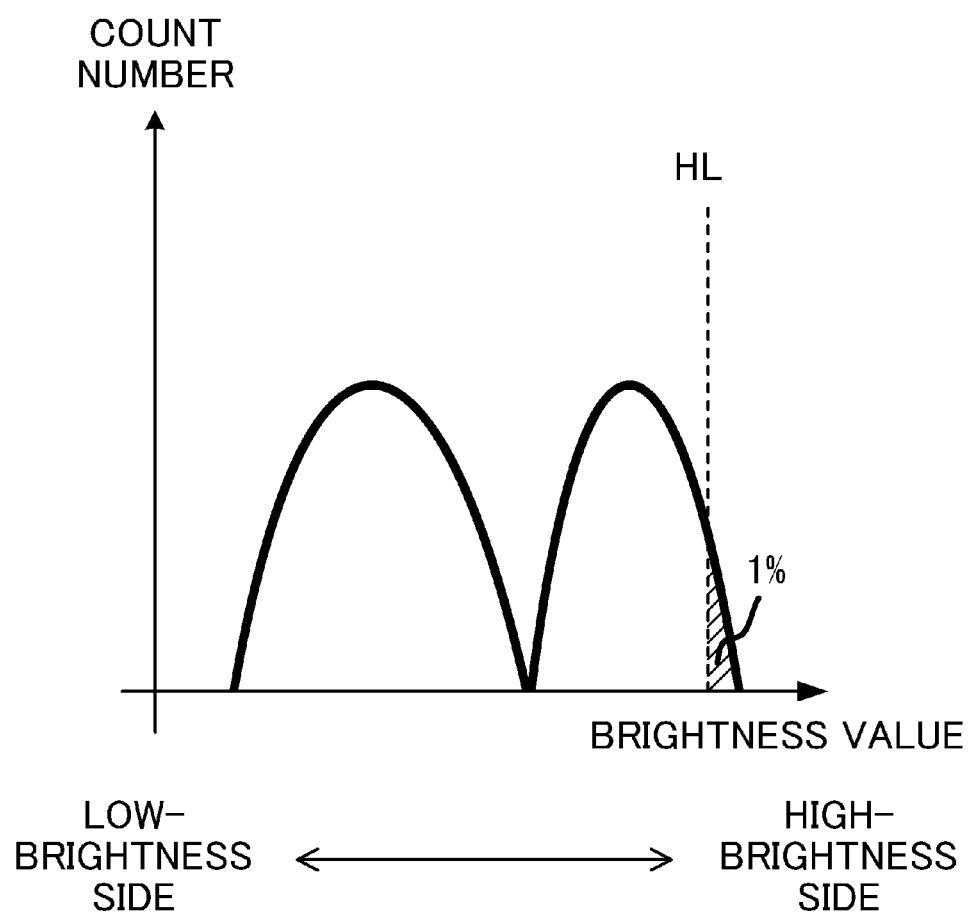

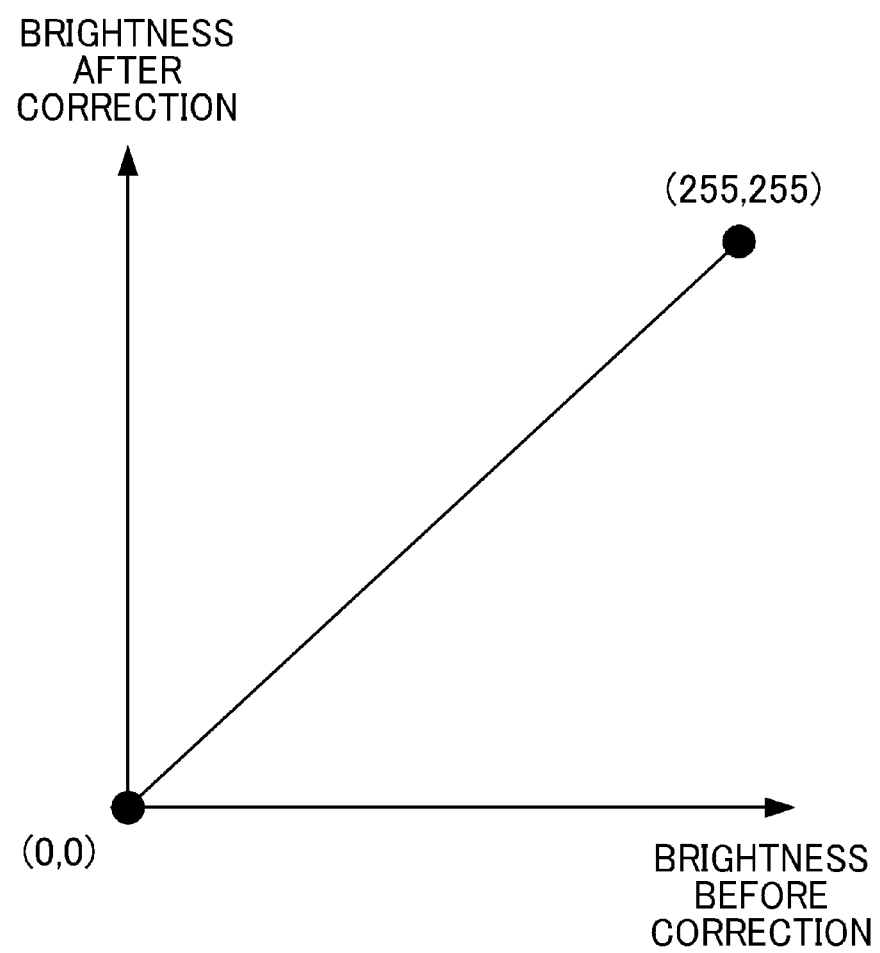

IMAGING DEVICE, METHOD FOR CONTROLLING IMAGING DEVICE AND NON-TRANSITORY COMPUTER-READABLE STORAGE MEDIUM WITH IMPROVING BRIGHTNESS THROUGH GRADATION CORRECTION

BACKGROUND OF THE INVENTION

Field of the Invention

The present invention relates to an imaging device and a method for controlling the imaging device.

Description of the Related Art

Conventionally, technologies to correct the gradation of images in order to obtain images having favorable brightness and contrast have been known. The lower the brightness of high-brightness regions in images, the lower the contrast of the images becomes. In this case, the gradation of the high-brightness regions in the images is corrected to be much brighter, whereby the contrast is increased and visual impression is improved.

Japanese Patent Application Laid-open No. 2000-36043 discloses a technology to adjust contrast and correct color fogging. Further, Japanese Patent Application Laid-open No. 2015-166767 discloses a technology to control exposure more stably while placing priority on a highlight portion (high-brightness region) in a screen.

When the gradation of a high-brightness region is corrected to be brighter in order to increase contrast, there is a case that the brightness of an image is different from brightness intended by a user. Further, when gradation is not appropriately corrected even if exposure is controlled with priority placed on a high-brightness region, there is a case that the brightness of the high-brightness region is different from brightness intended by the user.

SUMMARY OF THE INVENTION

The present invention provides a technology to appropriately correct the gradation of the brightness of a high-brightness region.

The present invention provides an imaging device including at least one memory and at least one processor which function as: a setting unit configured to set a target brightness level of a high-brightness region in an imaging scene; an exposure control unit configured to perform photometry to control exposure; and a gradation correction unit configured to perform predetermined gradation correction on an image obtained by imaging, wherein a mode for controlling the exposure includes a first photometry mode, in which photometry is performed using the high-brightness region as a photometry region and exposure is controlled on a basis of a target brightness level set by the setting unit, and a second photometry mode different from the first photometry mode, and the gradation correction unit suppresses the predetermined gradation correction more in a case in which the image is obtained by imaging using the first photometry mode than in a case in which the image is obtained by imaging using the second photometry mode.

Further features of the present invention will become apparent from the following description of exemplary embodiments with reference to the attached drawings.

BRIEF DESCRIPTION OF THE DRAWINGS

FIG. 3 is a flowchart illustrating basic gradation correction processing;

FIG. 4 is a graph illustrating a brightness histogram and a feature amount;

FIG. 7 is a graph illustrating a line-type tone curve;

DESCRIPTION OF THE EMBODIMENTS

Hereinafter, embodiments of the present invention will be described on the basis of the drawings.

Figure 1:
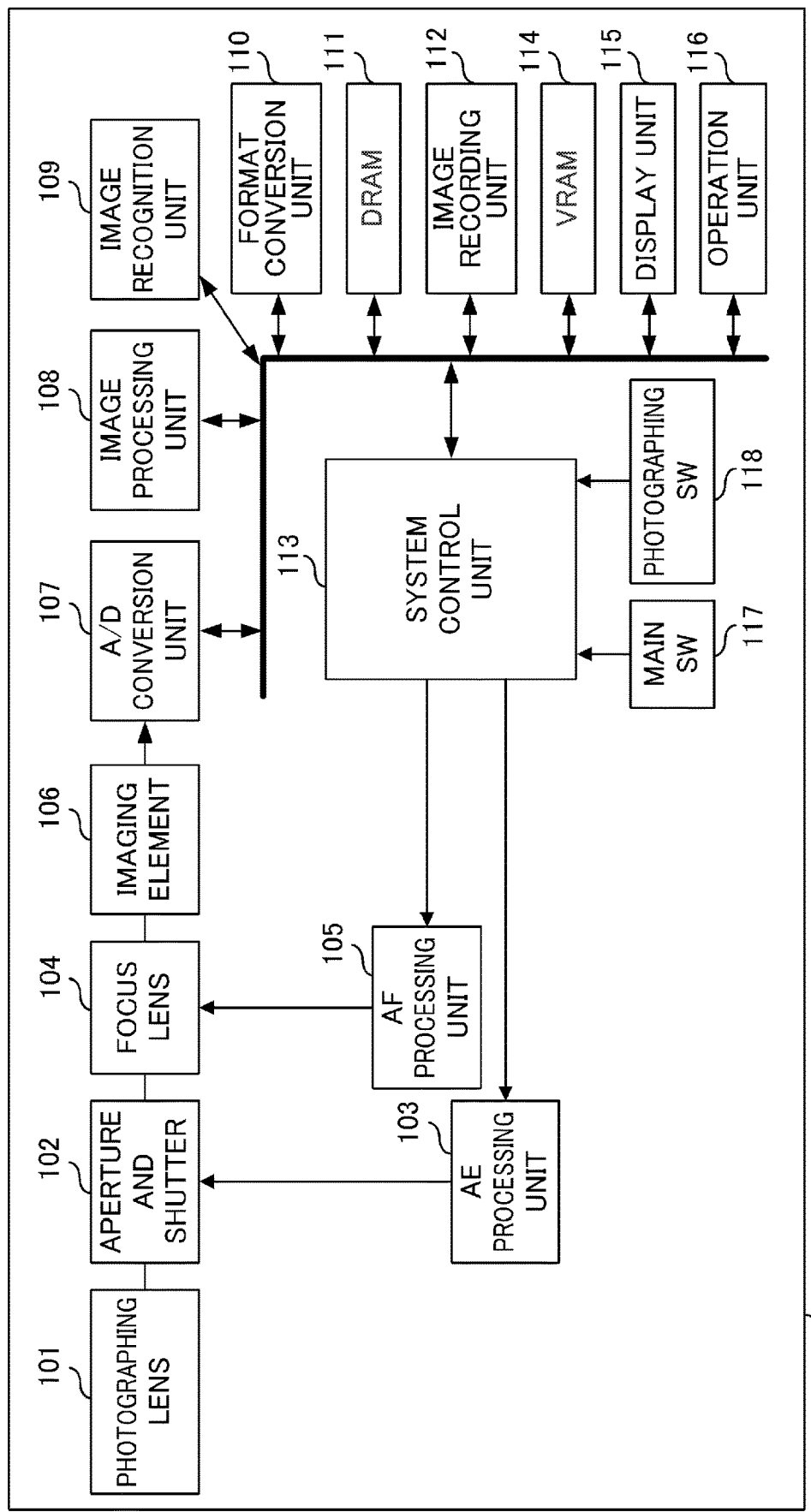
FIG. 1 is a block diagram illustrating the configuration of a digital camera.

(Configuration of Digital Camera) FIG. 1 is a block diagram illustrating the configuration of a digital camera 100 serving as an imaging device according to an embodiment of the present invention. The digital camera 100 includes a photographing lens 101, an aperture and shutter 102, an automatic exposure (AE) processing unit 103, a focus lens 104, an autofocus (AF) processing unit 105, an imaging element 106, an A/D conversion unit 107 as an imaging mechanism.

The photographing lens 101 has a zoom mechanism. The aperture and shutter 102 controls the amount of light that is reflected from a subject and incident onto the imaging element 106 and a charge accumulation time according to instructions from the AE processing unit 103. The AE processing unit 103 controls exposure by performing photometry on a photometric region corresponding to a photometry mode and controlling the operation of the aperture and shutter 102. Further, the AE processing unit 103 controls the A/D conversion unit 107. The focus lens 104 forms an optical image so as to be focused on the light-receiving surface of the imaging element 106 according to a control signal from the AF processing unit 105. Further, the AF processing unit 105 calculates information on a distance from the digital camera 100 to a subject.

The imaging element 106 converts an optical image formed on the light-receiving surface into an electric signal by a photoelectric conversion unit such as a CCD element or a CMOS element and outputs the converted electric signal to the A/D conversion unit 107. The A/D conversion unit 107 converts the received electric signal (analog signal) into a digital signal. The A/D conversion unit 107 includes a CDS circuit that eliminates noise from the received electric signal and a nonlinear amplification circuit that nonlinearly amplifies the received electric signal before converting the same into the digital signal.

Further, the digital camera 100 includes an image processing unit 108, an image recognition unit 109, a format conversion unit 110, and a DRAM (Dynamic RAM) 111. The image processing unit 108 applies predetermined pixel interpolation, resize processing such as image reduction, and color conversion processing to a digital signal input from the A/D conversion unit 107 and performs development processing to output image data.

The image processing unit 108 adjusts white balance (WB) and performs gradation correction by increasing/decreasing the brightness level of an image or the like with respect to a digital signal input from the A/D conversion unit 107 to adjust the image quality of a photographed image. For example, the image processing unit 108 has the function of increasing/decreasing the brightness level of an entire image at a uniform change rate with respect to the brightness level of image data and the tone curve (gamma) function of converting a signal level according to the magnitude of an original signal level. The image processing unit 108 realizes gradation correction processing by these functions.

The image recognition unit 109 receives the input of image data appropriately processed by the image processing unit 108. The image recognition unit 109 is enabled to recognize the situation of the brightness of an input image as photometry processing. The image recognition unit 109 divides image data into a plurality of regions to perform photometry. Accordingly, the image recognition unit 109 is enabled to determine a high-brightness region inside an image and acquire a photometry result in the high-brightness region.

The high-brightness region may be a region (brightness region) having brightness of at least a predetermined threshold like a region having brightness of at least 210 in, for example, an 8-bit image. Further, the high-brightness region may be determined on the basis of relative brightness inside an image like a region having brightness with a cumulative frequency of not more than 10% from a high-brightness side in a brightness histogram.

The image recognition unit 109 is enabled to recognize a scene according to a known technology. When detecting, for example, a face, the image recognition unit 109 recognizes a scene to photograph a person. A photometry result and scene recognition information obtained by the image recognition unit 109 are output to the AE processing unit 103.

A user is enabled to select a photometry mode through an operation unit 116. The operation unit 116 outputs a photometry mode selected by the user to the AE processing unit 103. The AE processing unit 103 performs automatic exposure on the basis of a photometry result and scene recognition information output from the image recognition unit 109 and information such as a photometry mode output from the operation unit 116

The image recognition unit 109 is enabled to recognize the focusing situation of an input image. The recognition result of the focusing situation is output to the AF processing unit 105. The AF processing unit 105 realizes AF control on the basis of the recognition result of the focusing situation.

The format conversion unit 110 converts the format of image data generated by the image processing unit 108 in order to store the image data in a DRAM 111. The DRAM 111 is a built-in memory and is used as a buffer responsible for temporarily storing image data or a work memory or the like in processing to compress/expand image data.

The digital camera 100 includes an image recording unit 112, a system control unit 113, a VRAM (Video RAM) 114, a display unit 115, the operation unit 116, a main switch (main SW) 117, and a photographing switch (photographing SW) 118. The image recording unit 112 has a recording medium such as a memory card on which a photographing image (a still image and a moving image) is recorded and an interface for the recording medium.

The system control unit 113 has a CPU (processor), a ROM, and a RAM. The CPU controls the entire operation of the digital camera 100 by developing a program stored in the ROM into the work area of the RAM and running the developed program. The system control unit 113 is enabled to realize the processing of the respective configurations of the digital camera 100 by running a program stored in the ROM. The system control unit 113 controls which of a plurality of imaging driving modes of the imaging element 106 is used. The VRAM 114 is a memory for an image display.

Figure 2:
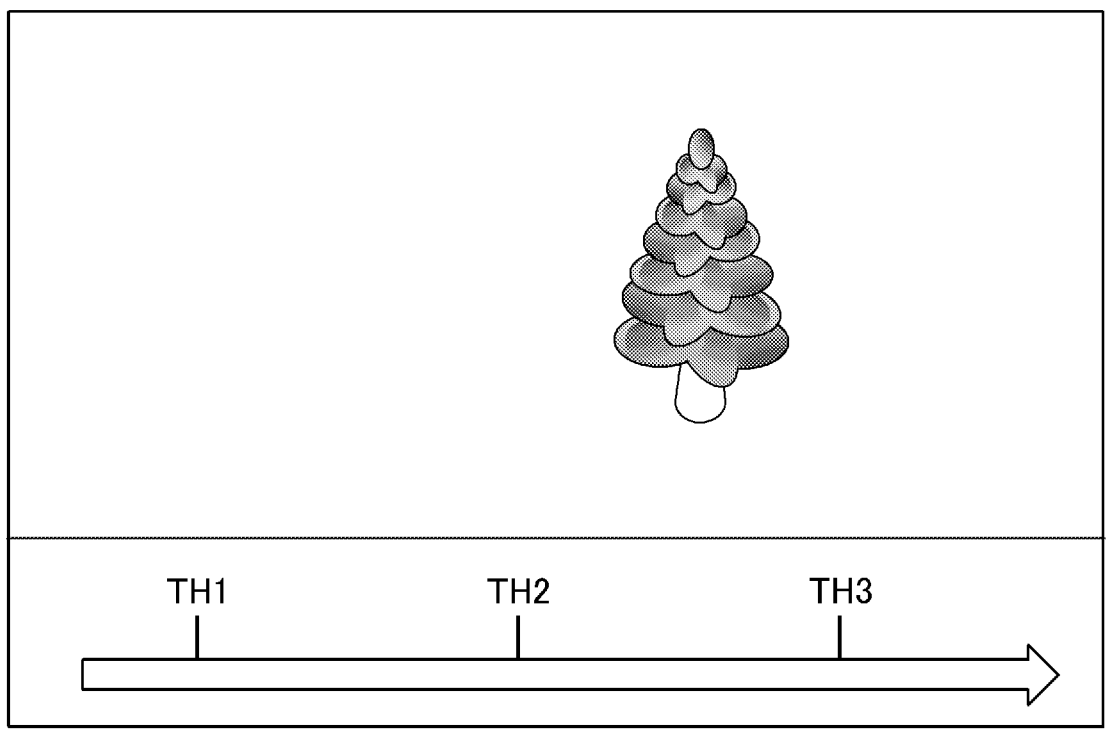
FIG. 2 is a screen example in which a user selects the target brightness of a high-brightness region.

The display unit 115 is, for example, an LCD (Liquid Crystal Display) or the like. The display unit 115 displays a photographing screen and a distance measurement region during photographing, besides an image, operation assistance, and the state of the digital camera 100. Further, as illustrated in FIG. 2, the display unit 115 displays a screen used by the user to select the target value or upper-limit threshold of the brightness of a high-brightness region.

The operation unit 116 is a member used by the user to operate the digital camera 100 from the outside. Through the operation unit 116, the user is enabled to perform various settings such as exposure correction, the setting of an aperture value, and the setting of image reproduction. The operation unit 116 has a menu switch, a zoom lever used to instruct the zoom operation of the photographing lens, an operation mode selection switch used to switch between a photographing mode and a reproduction mode, or the like.

The user is enabled to select a photometry mode by operating the operation unit 116. The photometry mode selectable by the user includes, for example, an evaluation photometry mode, a partial photometry mode, and a highlight-weighted photometry mode.

The evaluation photometry mode is a mode in which photometry is performed for each region with a screen divided into a plurality of photometry regions and final exposure is determined on the basis of information such as the brightness distribution, color, distance, and composition of a subject. The evaluation photometry mode is suitable for general photographing including backlight photographing. The partial photometry mode is a mode in which photometry is performed in the range of a screen central area. The partial photometry mode is effective when there is strong light around a subject due to backlight. The highlight-weighted photometry mode is a mode in which exposure is determined so that a high-brightness region inside a screen mainly has proper brightness. The highlight-weighted photometry mode is a mode in which photometry is intensively performed using a high-brightness region as a photometry region. Generally, when exposure control is performed so that a high-brightness region inside a screen has proper brightness, darker exposure is obtained in the highlight-weighted photometry mode than in the evaluation photometry mode.

The user is enabled to select the target value or upper-limit threshold of the brightness of a high-brightness region by operating the operation unit 116 on the screen shown in FIG. 2. The target value or upper-limit threshold of the brightness of the high-brightness region selected by the user is output to the AE processing unit 103 to control exposure and output to the image processing unit 108 to control image processing.

The main switch 117 is a switch used to input power to the digital camera 100. The photographing switch 118 is a switch used to perform the two stages of operations according to pressing depth. On the basis of a half-pressing operation (SW1 operation) in which the photographing switch 118 is pressed halfway, the system control unit 113 performs a photographing preparation operation such as AE processing and AF processing. On the basis of a full-pressing operation (SW2 operation) in which the photographing switch 118 is fully pressed, the system control unit 113 performs photographing processing.

A series of processing performed by the digital camera 100 will be described. When power is input with the press of the main switch 117, the system control unit 113 of the digital camera 100 performs imaging processing at a predetermined cycle (at every, for example, 33 ms) with the imaging element 106. The digital camera 100 is brought into an actual photographing standby state in which captured images are sequentially displayed on the display unit 115. When receiving instructions to perform photographing on the basis of the pressing (SW2 operation) of the photographing switch 118, the system control unit 113 performs actual photographing processing with the imaging element 106. The system control unit 113 performs image processing on a captured image with the image processing unit 108 and records image data after the image processing on the image recording unit 112. The digital camera 100 returns back to the actual photographing standby state again. When the main switch 117 is pressed again, the power of the digital camera 100 is turned off.

FIG. 2 shows an example of a screen for selecting the target value or upper-limit threshold of the brightness of a high-brightness region. Hereinafter, the target value or upper-limit threshold of the brightness of a high-brightness region will also be generically described as the "target brightness of a high-brightness region." The user is enabled to select the target brightness of a high-brightness region by, for example, operating the direction key of the operation unit 116 to make any of TH1, TH2, and TH3 selectable and pressing a determination button for determining various settings.

Here, gradation correction in a case in which the user changes the target brightness of a high-brightness region will be described. When performing photographing in the highlight-weighted photometry mode, the user is enabled to select the target brightness of a high-brightness region and adjust the brightness of an image. The display unit 115 of the digital camera 100 presents a plurality of candidates for target brightness selectable by the user. In the example of FIG. 2, the user selects one of TH1, TH2, and TH3 as the target brightness of a high-brightness region. For example, TH1, TH2, and TH3 may be set at 120, 150, and 200, respectively, in an 8-bit image.

The digital camera 100 controls exposure so that the actual brightness of the high-brightness region comes close to the selected target brightness TH. The high-brightness region may be a region having brightness of at least a predetermined threshold or a region having brightness with a cumulative frequency of not more than a predetermined ratio (for example, not more than 10%) from a high-brightness side in a brightness histogram. Brightness (hereinafter also called representative brightness) representing the high-brightness region can be, for example, an average value, a maximum value, a minimum value, a median value, or a mode value of the brightness of pixels included in the high-brightness region.

When an image is photographed darker than intended after setting the target brightness TH at TH1, the user changes the target brightness TH from TH1 to TH3 via TH2 in sequence to perform photographing again. On the other hand, when an image is photographed brighter than intended after setting the target brightness TH at TH3, the user changes the target brightness TH from TH3 to TH1 via TH2 in sequence to perform photographing again.

When gradation correction is performed so that the high-brightness region becomes brighter, there is a case that the brightness of an image becomes different from brightness intended by the user although the contrast of the image becomes high. The change of the brightness of an image based on gradation correction will be described for each of a case in which the target brightness TH is increased and a case in which the target brightness TH is decreased.

When an image is photographed darker than intended after setting the target brightness TH at TH1, the user makes an attempt to photograph a brighter image by increasing the target brightness TH from TH1 to TH3 via TH2. When the target brightness TH is set at TH1, an image becomes darker and the brightness of a high-brightness region becomes lower compared with a case in which the target brightness TH is set at TH2. Therefore, when the target brightness TH is set at TH1, gradation correction becomes stronger and the high-brightness region becomes brighter compared with a case in which the target brightness TH is set at TH2.

On the other hand, when the target brightness TH is set at TH2, an image becomes brighter and the brightness of the high-brightness region becomes higher compared with a case in which the target brightness TH is set at TH1. Therefore, gradation correction is suppressed more than the case in which the target brightness TH is set at TH2 than in a case in which target brightness TH is set at TH1. Accordingly, the image after the gradation correction does not make an impression that the image becomes brighter to the same degree as the case in which the target brightness TH is set at TH1.

Using a relational expression, the brightness of a high-brightness region before and after gradation correction will be described for each of a case in which the target brightness TH is set at TH1 and a case in which the target brightness TH is set at TH2. When the target brightness TH is set at TH1, it is assumed that the brightness of the high-brightness region before the gradation correction is Y1 and that the brightness of the high-brightness region after the gradation correction is Y'1. When the target brightness TH is set at TH2, it is assumed that the brightness of the high-brightness region before the gradation correction is Y2 and that the brightness of the high-brightness region after the gradation correction is Y'2. Y1 comes close to TH1 and becomes Y'1, and Y2 comes close to TH2 and becomes Y'2.

When the target brightness TH is changed from TH1 to TH2, the brightness is expected to be increased by (Y2−Y1) but is actually increased by (Y'2−Y'1). The relationship between the expected increase in the brightness and the actual increase in the brightness is expressed as (Y2−Y1)> (Y'2−Y'1). This is because the gradation correction becomes weaker as an image is brighter. Further, since Y'1 could become higher than Y'2 when the degree of the gradation correction becomes strong, the brightness of an image becomes opposite to the target brightness TH intended by the user. The same relationship is also established in a case in which the target brightness TH is changed from TH2 to TH3.

When an image is photographed brighter than intended after setting the target brightness TH at TH3, the user makes an attempt to photograph a darker image by decreasing the target brightness TH from TH3 to TH1 via TH2. Since an image becomes darker as the target brightness TH is decreased, gradation correction becomes stronger. Therefore, even when the target brightness TH is decreased, the brightness of a high-brightness region does not become low as expected by the user and an image does not become dark. Further, if gradation correction for a high-brightness region excessively becomes strong, the high-brightness region is corrected to be brighter than the target brightness TH of the high-brightness region selected by the user. As a result, a screen becomes brighter contrary to the user's expectation.

A gradation correction method performed by the digital camera 100 having the configuration illustrated in FIG. 1 will be described. Gradation correction is performed by the image processing unit 108.

(Basic Gradation Correction Method) A basic gradation correction method will be described with reference to FIG. 3. FIG. 3 is a flowchart illustrating basic gradation correction processing. The basic gradation correction processing is performed by the image processing unit 108 having received instructions from the system control unit 113. FIG. 3 shows an example of gradation correction using tone curve correction. In the basic gradation correction method, the user does not set target brightness but target brightness set in advance is used.

In step S301, the image processing unit 108 detects the brightness of image data to generate a brightness histogram. A range in which the image processing unit 108 detects the brightness of the image data is the entirety of the image data, but the image processing unit 108 may detect the brightness of the image data from a region excluding the periphery (end) of an image.

A reason why the image processing unit 108 generates the brightness histogram from the region excluding the periphery of the image will be described. In the peripheral region of the image, the brightness tends to be low due to a reduction in the amount of light on the periphery of a lens. Therefore, the histogram of the peripheral region of the image is deviated to a low-brightness side, and the brightness is not properly detected.

Further, there is a possibility that no subject is present in the peripheral region of the image. Since the user does not pay attention to the peripheral region when no subject is present in the peripheral region, the peripheral region is preferably not included in the detection range. In addition, there is a case that a static image and a moving image are photographed in the same scene and the effect of gradation correction is desired to be uniformized. An image aspect ratio is 3:2 or 4:3 in a static image and is 16:9 or the like in a moving image. Therefore, it is possible to uniformize the effect of the gradation correction between a static image and a moving image by removing the upper and lower ends in the static image.

In step S302, the image processing unit 108 detects the feature amount of the generated brightness histogram. The feature amount detected in step S302 is an example of representative brightness representing the brightness of a high-brightness region. The brightness histogram generated in step S301 and the feature amount detected in step S302 will be described with reference to FIG. 4. FIG. 4 shows the brightness histogram generated in step S301. A horizontal axis shows a brightness value, and a vertical axis shows a count number (the number of pixels).

As shown in FIG. 4, the image processing unit 108 detects, as the feature amount HL, a level (brightness value) at which pixels with a cumulative frequency (a part indicated by slant lines) of 1% from a high-brightness side in the brightness histogram are contained. Note that the ratio of the cumulative frequency for detecting the feature amount HL is not limited to 1% but another ratio may be used. For example, the ratio of the cumulative frequency for detecting the feature amount HL is preferably at least 1% and not more than 10%.

When the ratio of the cumulative frequency is set to be lower than 1%, there is a possibility that the feature amount HL is determined on the basis of the brightness of high-brightness noise. In order to determine the feature amount HL on the basis of the brightness of a subject, the ratio of the cumulative frequency is preferably at least 1%. Further, the high-brightness noise increases as ISO sensitivity increases. Therefore, the ratio of the cumulative frequency for detecting the feature amount HL may be controlled to be increased as the ISO sensitivity increases.

In step S303, the image processing unit 108 acquires the target brightness (target brightness level) of gradation correction. The target brightness level is a value (for example, 210 or the like) set in advance and stored in, for example, a ROM. The image processing unit 108 determines a tone curve to perform gradation correction so that the feature amount HL comes close to the target brightness level.

When the target brightness level is a value set in advance, the image processing unit 108 performs gradation correction so that the brightness of an image increases up to the target brightness level regardless of the brightness of the image. Therefore, the contrast of the image excessively increases in some cases.

In order to prevent the contrast from excessively increasing, the image processing unit 108 may set a value between predetermined brightness Yt and the feature amount HL as the target brightness level. For example, the image processing unit 108 sets Yt−α×(Yt−HL) as the target brightness level. α is a value in the range of at least 0 and not more than 1. By setting α at, for example, not more than 0.5, the image processing unit 108 is enabled to perform gradation correction so as not to exceed the predetermined brightness Yt and prevent the contrast from excessively increasing even for a dark image that is difficult to be subjected to gradation correction as intended. For example, in a case in which Yt is 220 and α is 0.5, the target brightness level is 190 when the feature amount HL is 160 and is 160 when the feature amount HL is 100. The target brightness level decreases as the feature amount HL decreases.

Figure 5A:
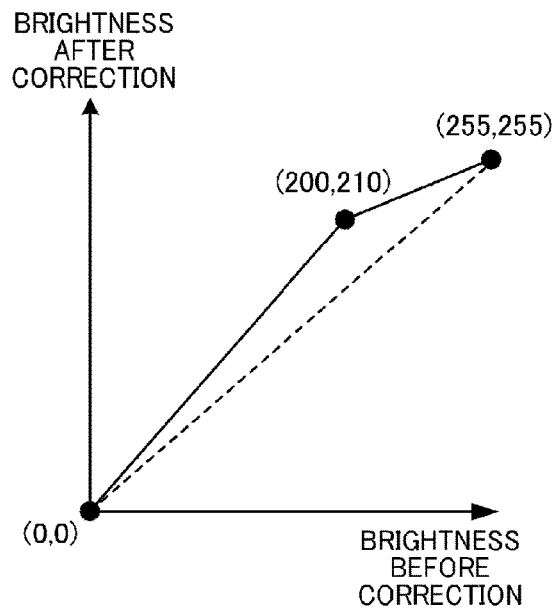
FIGS. 5A to 5D are graphs each showing an example of a tone curve used in gradation correction.

In step S304, the image processing unit 108 determines the curve of tone curve correction. FIGS. 5A to 5D are graphs each showing an example of a tone curve used in gradation correction. It is assumed that the feature amount HL detected in step S302 is 200 and that the target brightness level acquired in step S303 is 210. In this case, the tone curve is a broken-line type connecting points (0, 0), (200, 210), and (255, 255) to each other as shown in FIG. 5A. That is, the brightness of the feature amount HL (200) is corrected into the brightness of the target brightness level (210). In FIG. 5A, the input axis (horizontal axis) of the tone curve is brightness before correction, and the output axis (vertical axis) thereof is brightness after correction.

Figure 5B:
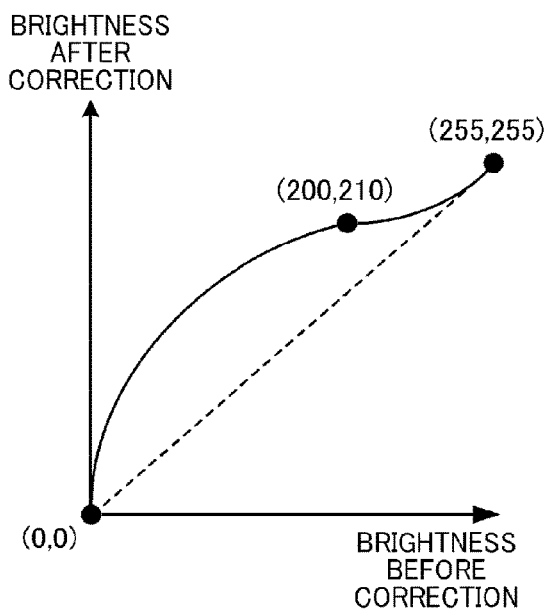
Figure 5C:
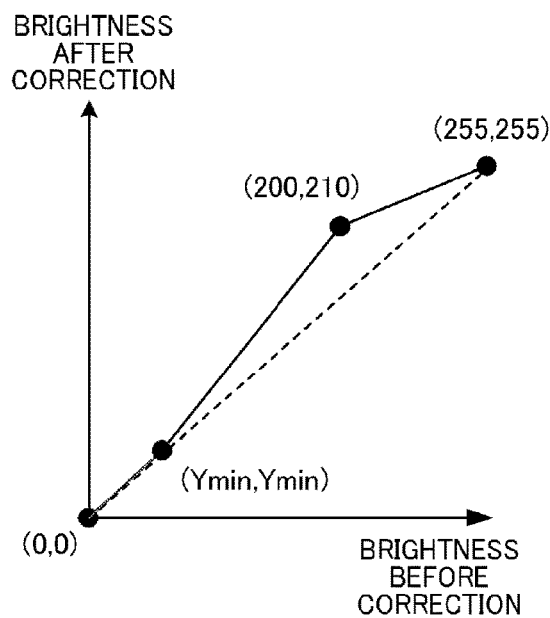
Figure 5D:
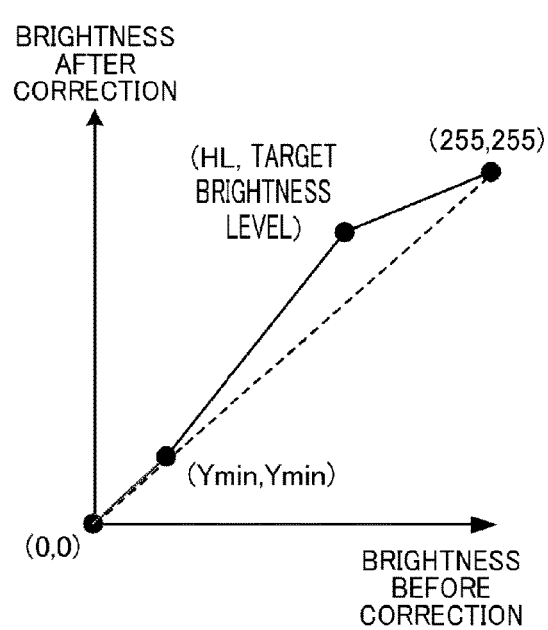

The tone curve is not limited to a broken-line type but may include other types shown in FIGS. 5B to 5D. In FIGS. 5B to 5D, the input axis (horizontal axis) of a tone curve is brightness before correction, and the output axis (vertical axis) thereof is brightness after correction.

A tone curve shown in FIG. 5B is an example of a curved line using spline interpolation or the like. A tone curve shown in FIG. 5C is an example in which an apex is added to the tone curve of the broken-line type of FIG. 5A. The number of apexes other than end points is not limited to one shown in FIG. 5A but may be two as in the case of FIG. 5C or at least three. The tone curve of FIG. 5C is an example in which the apex of (Ymin, Ymin) is added, for example, when minimum brightness is Ymin in an image. The addition of the apex (Ymin, Ymin) prevents the correction of the pixels of the minimum brightness and reduces black floating. A tone curve shown in FIG. 5D is an example in which the tone curve of FIG. 5C is generalized. The apex (200, 210) of FIG. 5C is described as (HL, target brightness level) in FIG. 5D.

In step S305, the image processing unit 108 performs the gradation correction of the image using the tone curve determined in step S304. The tone curve correction is correction processing to convert the gradation of an image by the application of a function f: x→y (0≤x and y≤255 in the case of an 8-bit image) in which an output brightness value y is associated with an input brightness value x. The function f is the tone curve determined in step S304.

The three types of gradation correction methods obtained by deforming the basic gradation correction method will be described. When the user changes the target brightness TH of a high-brightness region in the highlight-weighted photometry mode, the brightness of an image as intended by the user is not obtained in some cases. The following first to third gradation correction methods are methods for performing gradation correction so that an image having brightness intended by the user is obtained according to the target brightness TH set by the user.

(First Gradation Correction Method) The first gradation correction method is a method for switching whether or not to validate gradation correction according to a photometry mode. When the photometry mode is a mode such as the evaluation photometry mode and the partial photometry mode other than a predetermined photometry mode (first photometry mode), the basic gradation correction described in FIG. 3 is valid in order to increase contrast. The predetermined photometry mode is, for example, the highlight-weighted photometry mode. The highlight-weighted photometry mode is an example of the first photometry mode. Each of the evaluation photometry mode and the partial photometry mode is an example of a second photometry mode. When the photometry mode is the highlight-weighted photometry mode, there is a problem that the brightness of an image as intended by the user is not obtained with the validation of the basic gradation correction. Therefore, the gradation correction is invalidated in order to prevent contrast from excessively increasing in the highlight-weighted photometry mode.

Figure 6A:
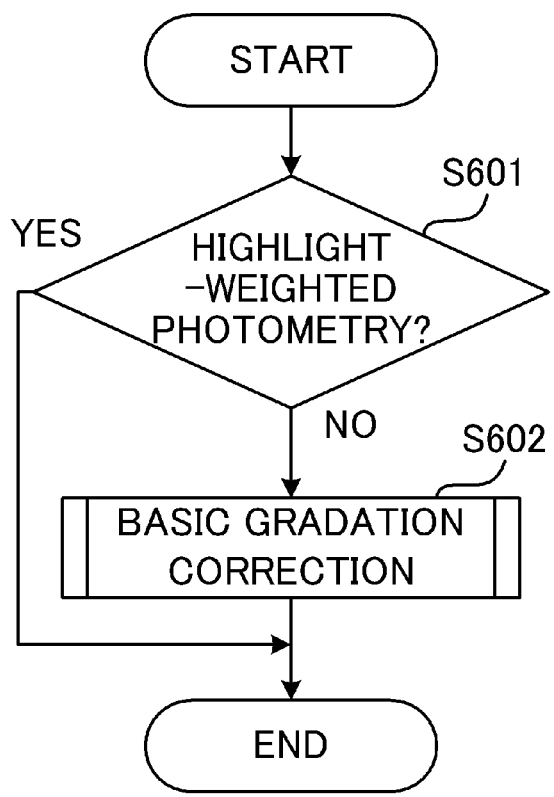
FIGS. 6A and 6B are flowcharts illustrating first gradation correction processing.
Figure 6B:
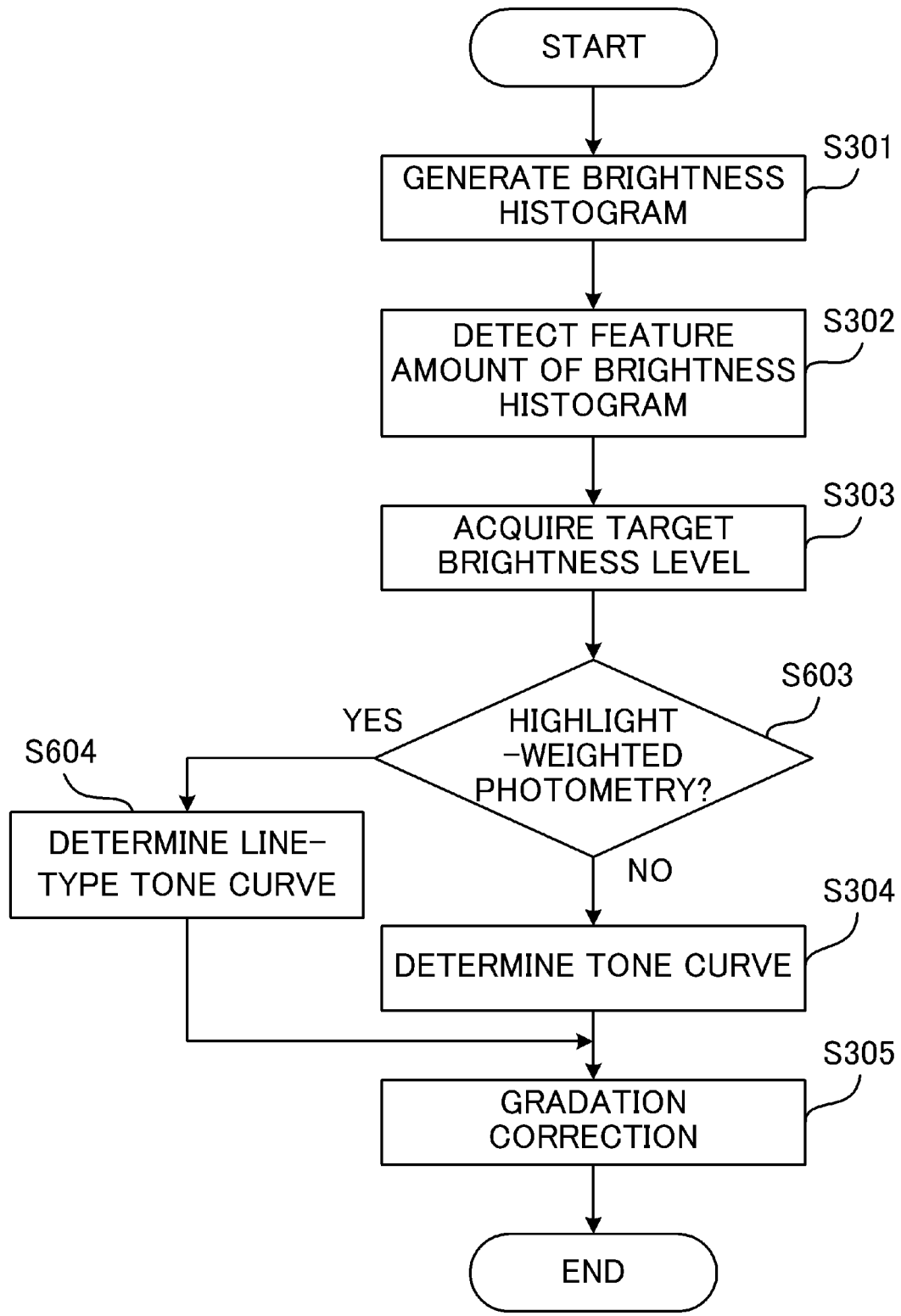

The first gradation correction method will be described with reference to FIGS. 6A and 6B. FIGS. 6A and 6B are flowcharts showing two examples of first gradation correction processing. The first gradation correction processing is performed by the image processing unit 108 having received instructions from the system control unit 113.

FIG. 6A shows a method for performing control so that gradation correction is not performed when a photometry mode is the highlight-weighted photometry mode. In step S601, the image processing unit 108 determines whether the photometry mode is the highlight-weighted photometry mode.

When the photometry mode is the highlight-weighted photometry mode, the image processing unit 108 invalidates the gradation correction and ends the processing of FIG. 6A without performing the gradation correction using a tone curve. When the photometry mode is not the highlight-weighted photometry mode, the image processing unit 108 performs basic gradation correction in step S602. The processing of step S602 is the same as that of steps S301 to S305 of FIG. 3.

FIG. 6B is a method for performing gradation correction so that brightness does not change when a photometry mode is the highlight-weighted photometry mode. In the flowchart of FIG. 6B, the same processing as that of FIG. 3 will be denoted by the same symbols and their detailed descriptions will be omitted. In step S301 of FIG. 6B, the image processing unit 108 generates a brightness histogram. In step S302, the image processing unit 108 detects the feature amount of the generated brightness histogram. In step S303, the image processing unit 108 acquires a target brightness level.

In step S603, the image processing unit 108 determines whether a photometry mode is the highlight-weighted photometry mode. When the photometry mode is the highlight-weighted photometry mode, the image processing unit 108 determines a line-type tone curve as a tone curve used in the gradation correction in step S604.

FIG. 7 is a graph illustrating a line-type tone curve. In the tone curve of FIG. 7, a horizontal axis shows brightness before correction, and a vertical axis shows brightness after correction. The line-type tone curve is a line connecting points (0, 0) and (255, 255) to each other. Since input brightness (brightness before correction) and output brightness (brightness after correction) are the same, brightness does not change even when the gradation correction is performed in step S604 of FIG. 6B. That is, the gradation correction using the line-type tone curve provides the same result as that obtained when the gradation correction is invalidated.

The gradation correction processing of FIG. 6A is suitable for a case in which the user wants to speed up processing without performing unnecessary processing. The gradation correction processing of FIG. 6B is suitable for a case in which the user does not want to change a processing time according to a photometry mode. This is because the user may feel a difficulty in use when a reaction time accompanied by any operation changes. When the gradation correction processing is designed so as to shift to a next operation after processing corresponding to a user operation ends, the time until the next operation is performed changes according to a photometry mode in the gradation correction processing of FIG. 6A. For example, a timing at which a next operation is enabled after the release of a shutter in the photographing of a static image, a timing at which a live view is restarted, a timing at which a photographed image is previewed, or the like becomes earlier in the highlight-weighted photometry mode than in other photometry modes.

Further, in order to realize the same real-time control as those of other photometry modes when a processing time is different according to a photometry mode, a control pattern different from those of other photometry modes is used in the highlight-weighted photometry mode. On the other hand, if a processing flow is made common between the highlight-weighted photometry mode and other photometry modes like the gradation correction processing of FIG. 6B, a tone curve may only be changed according to a photometry mode. As a result, the design of the gradation correction processing is simplified. For example, the image processing unit 108 may only use the line-type tone curve as shown in FIG. 7 in the highlight-weighted photometry mode.

(Second Gradation Correction Method) The first gradation correction method is a method for invalidating gradation correction when a photometry mode is the highlight-weighted photometry mode. On the other hand, a second gradation correction method is a method for decreasing the degree of gradation correction instead of invalidating the gradation correction when a photometry mode is the highlight-weighted photometry mode. The second gradation correction method suppresses gradation correction and makes it possible to increase contrast while reducing a user's sense of discomfort about the brightness of an image after the gradation correction.

Figure 8:
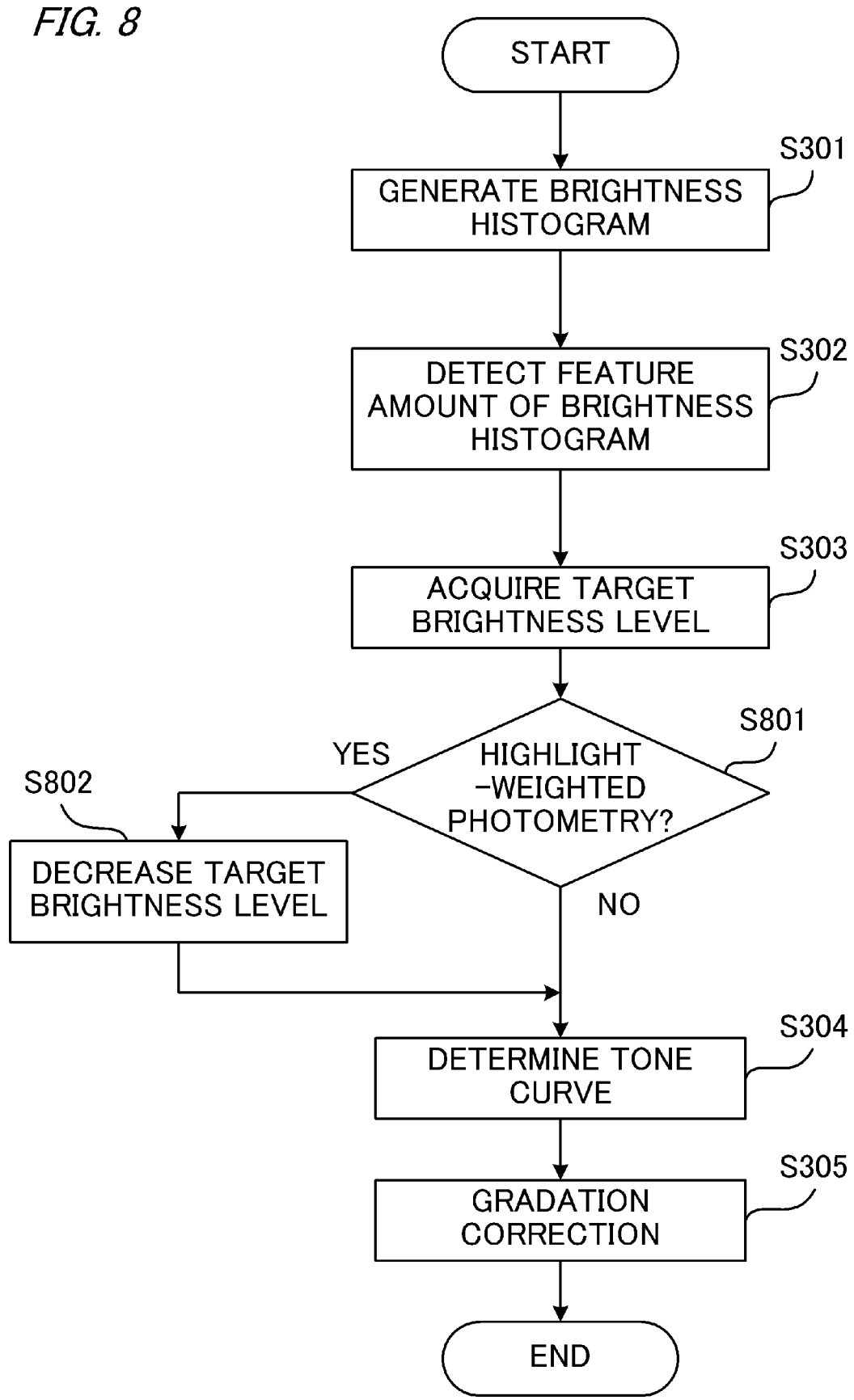
FIG. 8 is a flowchart illustrating second gradation correction processing.

The second gradation correction method will be described with reference to FIG. 8. FIG. 8 is a flowchart illustrating second gradation correction processing. In the flowchart of FIG. 8, the same processing as that of FIG. 3 will be denoted by the same symbols and their detailed descriptions will be omitted. In step S301 of FIG. 8, the image processing unit 108 generates a brightness histogram. In step S302, the image processing unit 108 detects the feature amount of the generated brightness histogram. In step S303, the image processing unit 108 acquires a target brightness level.

In step S801, the image processing unit 108 determines whether a photometry mode is the highlight-weighted photometry mode. When the photometry mode is the highlight-weighted photometry mode, the image processing unit 108 decreases the target brightness level in step S802.

A decrease in the target brightness level is enabled using, for example, an offset Yo (0<Yo<Yt) set in advance. When it is assumed that the target brightness level acquired in S303 is Yt, the image processing unit 108 sets Yt−Yo as a new target brightness level. When Yt is 220 and Yo is 10, the target brightness level is expressed as Yt=220 in the evaluation photometry mode and expressed as Yt−Yo=210 (220−10) in the highlight-weighted photometry mode.

As another method for decreasing the target brightness level, the image processing unit 108 may multiply the target brightness level by gain Gy (0<Gy<1) set in advance and set Gy×yt as a new target brightness level. In any method, the target brightness level becomes smaller than Yt acquired in S303.

The image processing unit 108 determines a tone curve in step S304 using the new target brightness level decreased in step S802, and performs gradation correction in step S305. As described above, the image processing unit 108 is enabled to consequently suppress gradation correction by decreasing a target brightness level.

(Third Gradation Correction Method) A third gradation correction method is a method for changing the intensity of gradation correction according to the target brightness of a high-brightness region selected by the user. The third gradation correction method makes it possible to increase a contrast while realizing the brightness of an image intended by the user.

The image processing unit 108 acquires, as a target brightness level, the target brightness TH of a high-brightness region selected by the user on the screen of FIG. 2. The automatic exposure (AE) processing unit 103 controls exposure so that the brightness of the high-brightness region comes close to the target brightness TH. However, there is a case that the brightness of an image photographed according to automatic exposure control becomes darker than the target brightness TH as in a case in which the brightness of a scene is darker than the target brightness TH, a case in which a lighting environment is changed during photographing, or the like. In such a case, the image processing unit 108 is enabled to increase contrast by making a high-brightness region bright up to the target brightness TH by gradation correction.

Figure 9:
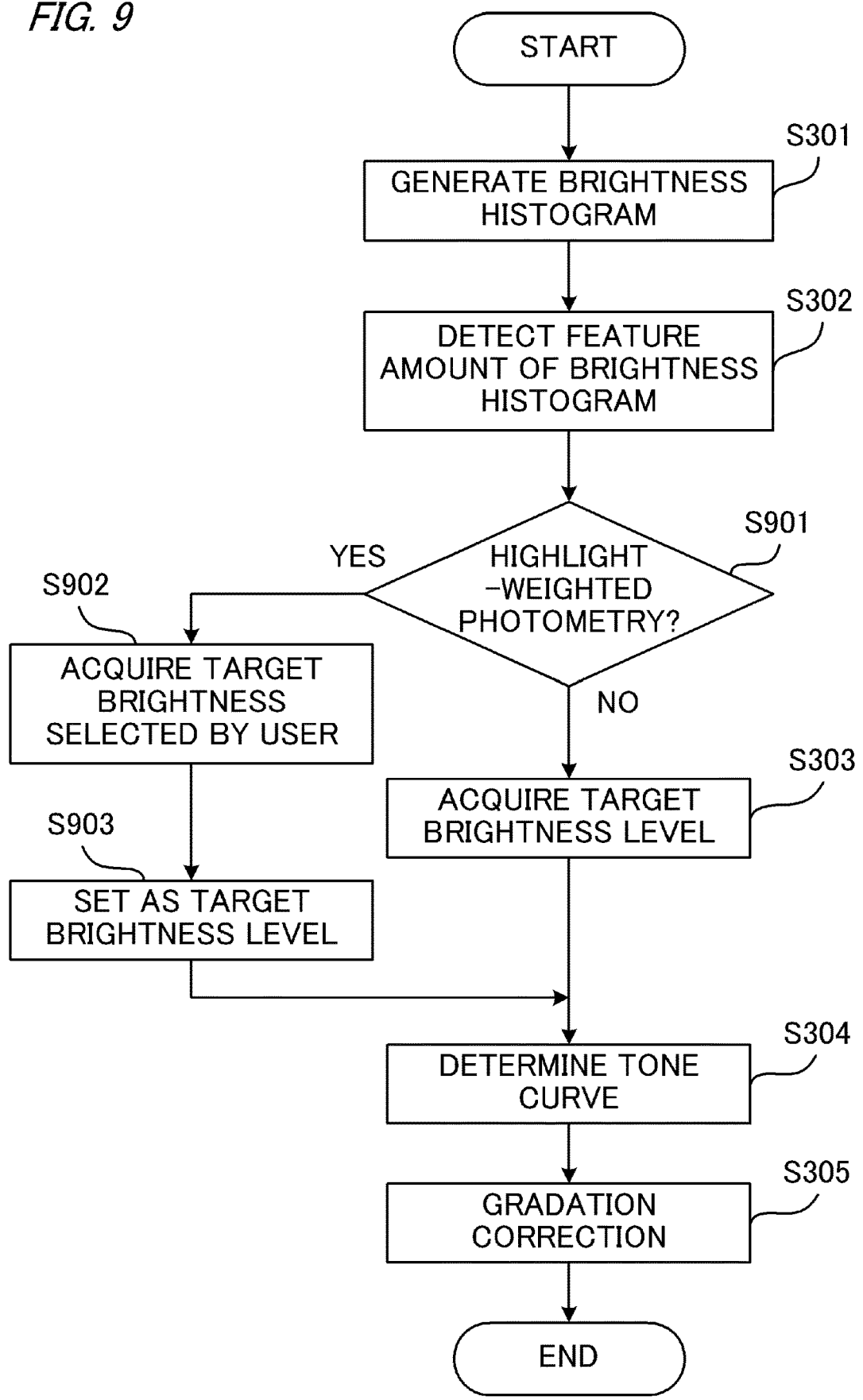
FIG. 9 is a flowchart illustrating third gradation correction processing.

The third gradation correction method will be described with reference to FIG. 9. FIG. 9 is a flowchart illustrating third gradation correction processing. In the flowchart of FIG. 9, the same processing as that of FIG. 3 will be denoted by the same symbols and their detailed descriptions will be omitted. In step S301 of FIG. 9, the image processing unit 108 generates a brightness histogram. In step S302, the image processing unit 108 detects the feature amount of the generated brightness histogram.

In step S901, the image processing unit 108 determines whether a photometry mode is the highlight-weighted photometry mode. When the photometry mode is the highlight-weighted photometry mode, the image processing unit 108 acquires the target brightness TH of a high-brightness region selected by the user through the operation unit 116 in step S902.

In step S903, the image processing unit 108 sets the target brightness TH of the high-brightness region selected by the user as a target brightness level. The image processing unit 108 is enabled to increase contrast within a range in which the brightness of the high-brightness region does not exceed the target brightness TH.

Since there is a possibility that contrast excessively increases as the difference between the feature amount HL detected in step S302 of FIG. 9 and the target brightness TH selected by the user increases, the target brightness level may be a brightness value between the feature amount HL and the target brightness TH selected by the user. For example, the image processing unit 108 sets HL+β×(TH−HL) as the target brightness level. β is a value in the range of at least 0 and not more than 1. Correction decreases when β comes close to 0 and increases when β comes close to 1. When β is 1, the brightness of the feature amount HL after correction becomes the target brightness TH.

In step S304 of FIG. 9, the image processing unit 108 determines the curve of tone curve correction on the basis of the target brightness level set in step S303 or step S903.

In step S305 of FIG. 9, the image processing unit 108 performs the gradation correction of an image using the tone curve determined in step S304. When the feature amount HL is determined with cumulative frequency set at 1% in step S302, brightness after correction exceeds the feature amount HL in a region in which the cumulative frequency is not more than 1% at maximum. That is, when the user switches the target brightness to any of TH1, TH2, and TH3, the maximum brightness of an image changes so as to get close to the target brightness TH selected by the user. Therefore, the user is enabled to change the brightness as intended.

Figures 10A, 10B:
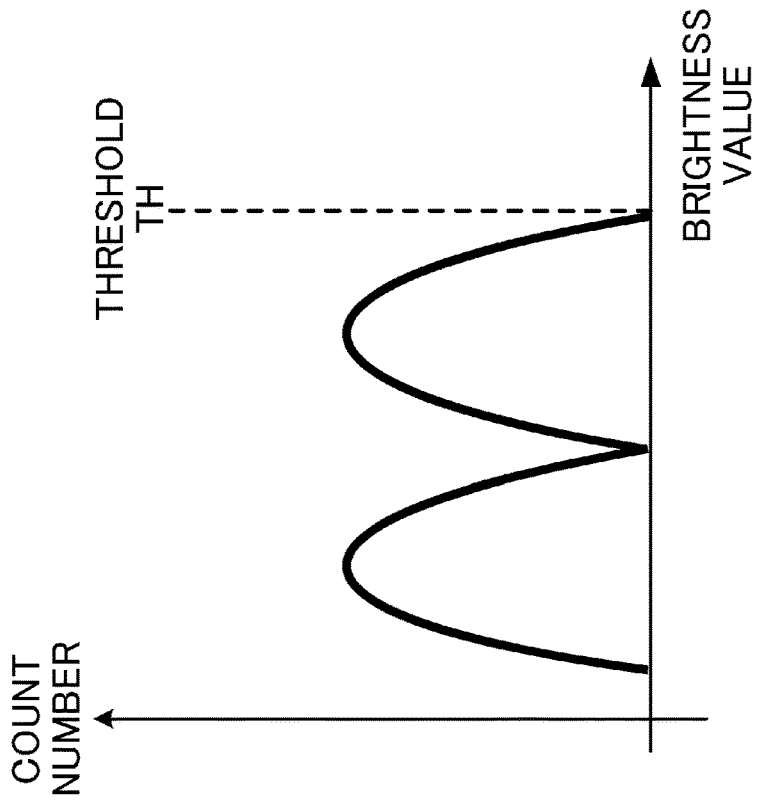
FIGS. 10A and 10B are graphs for describing target brightness TH.

The target brightness TH used as a target brightness level has the two meanings of an upper-limit threshold and a target value. FIGS. 10A and 10B are graphs for describing the target brightness TH. FIG. 10A shows an example of a brightness histogram in a case in which the target brightness TH is an upper-limit threshold. The target brightness TH is the upper limit of brightness, and the image processing unit 108 performs gradation correction so as not to exceed the target brightness TH (upper-limit threshold). However, even in a case in which the target brightness TH is set as an upper-limit threshold, the image processing unit 108 may allow the brightness of a high-brightness region to exceed the target brightness TH in a region with a cumulative frequency of, for example, within 1% from the high-brightness side in the brightness histogram.

FIG. 10B shows an example of a brightness histogram in a case in which the target brightness TH is a target value. When the target brightness TH is a target value, it is desirable to perform gradation correction so that the brightness of a high-brightness region comes close to the target brightness TH (target value). The brightness of a part of the high-brightness region may exceed the target brightness TH.

The high-brightness region may be, for example, a region having brightness of at least a predetermined threshold (for example, 210) or a region having brightness with a cumulative frequency of not more than a predetermined ratio (for example, 10%) from a high-brightness side in a brightness histogram but is not limited to such a region. FIG. 10B shows an example in which the shape of a brightness histogram is detected and a brightness region included in a mountain on a high-brightness side is regarded as a high-brightness region. For example, the image recognition unit 109 may recognize, as the mountain of a high-brightness side, a range from a point at which a count number (the number of pixels) from a high-brightness side in a brightness histogram starts increasing to a point at which the count number changes to increase after decreasing via a point at which the count number changes to decrease. The high-brightness region is the region of a pixel group corresponding to a brightness region brighter than the point at which the count number starts increasing after the decrease.

Figure 11A:
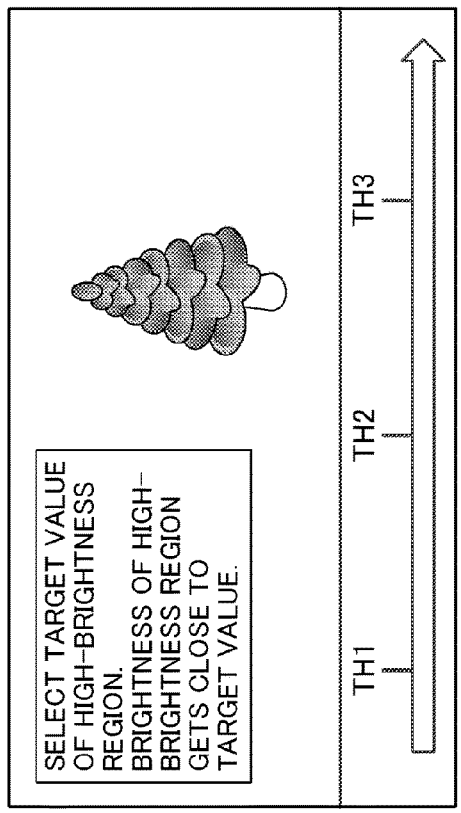
FIGS. 11A to 11C are screen examples in which the user selects target brightness TH.
Figure 11B:
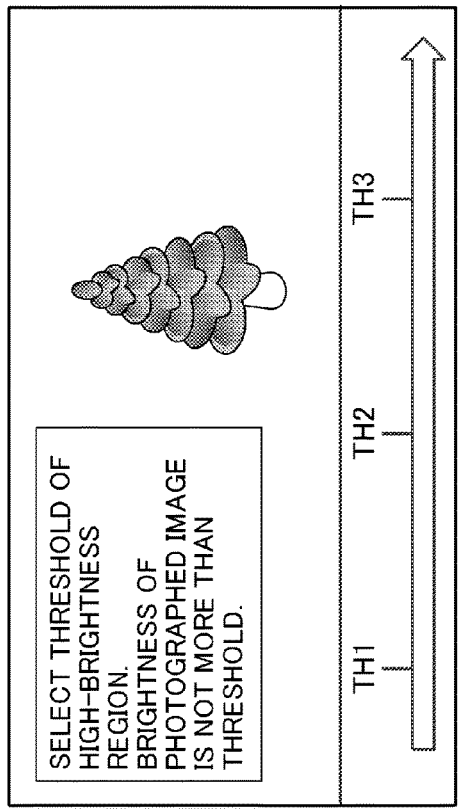
Figure 11C:
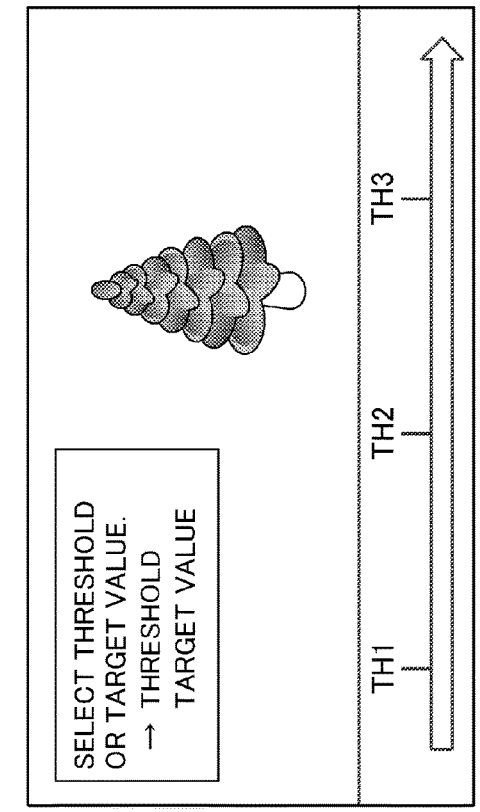

FIGS. 11A to 11C are screen examples in which the user selects target brightness TH. The screens of FIGS. 11A to 11C are displayed on the display unit 115. FIG. 11A is a screen example in which the user selects target brightness TH as an upper-limit threshold. FIG. 11B is a screen example in which the user selects the target brightness TH as a target value. The selection of the target brightness TH as an upper-limit threshold or a target value may be switched by the user. FIG. 11C is a screen example in which the user selects the target brightness TH as an upper-limit threshold or a target value.

Depending on whether the target brightness TH is an upper-limit threshold or a target value, some of the processing of FIG. 9 may be changed. The above example described in FIG. 9 assumes that brightness after correction exceeds the feature amount HL in a region in which the cumulative frequency is not more than 1%, and is an example in which the target brightness TH is selected as an upper-limit threshold.

On the other hand, a gradation correction method in a case in which the target brightness TH is selected as a target value will be described. When the target brightness TH is selected as a target value, the image processing unit 108 performs gradation correction so that brightness (representative brightness) representing a high-brightness region comes close to the target brightness TH. The representative brightness is, for example, the average value of the brightness (of pixels) of a region determined as a high-brightness region by the image recognition unit 109. Besides the average value of the brightness of the high-brightness region, the representative brightness may be brightness corresponding to the maximum value, minimum value, median value, and mode value of the brightness of the high-brightness region. Further, the representative brightness may be brightness at which pixels with a cumulative frequency of a predetermined ratio from a high-brightness side or a low-brightness side in a brightness histogram are contained. In addition, the representative brightness may be a value obtained by combining these values together.

The image processing unit 108 acquires representative brightness and performs gradation correction using the acquired representative brightness as a feature amount HL. By performing gradation correction using the representative brightness as the feature amount HL, the image processing unit 108 is enabled to perform the gradation correction so that the representative brightness comes close to target brightness TH.

Gradation correction processing in a case in which target brightness TH is selected as a target value will be described. The difference between the gradation correction processing in a case in which the target brightness TH is selected as a target value and the gradation correction processing in a case in which the target brightness TH is selected as an upper-limit threshold in FIG. 9 will be described. Instead of steps S301 and S302, the image processing unit 108 acquires the average value of brightness in a high-brightness region and determines the acquired average value as a feature amount HL.

In step S903, the image processing unit 108 calculates a target brightness level according to HL+β×(TH−HL) on the basis of the determined feature amount HL and the target brightness TH selected by the user in step S902. The image processing unit 108 determines a tone curve in step S304, and performs gradation correction in step S305. The average value of the brightness of the high-brightness region comes close to the target brightness TH, and the brightness of the entire high-brightness region comes close to the target brightness TH. Since the user is enabled to adjust brightness by seeing the entire high-brightness region rather than seeing the brightest local region, the he/she is enabled to easily make the brightness of an image close to desired brightness.

There is a possibility that the brightness of a high-brightness region becomes brighter than target brightness TH before correction as in a case in which the brightness of a scene is brighter than the target brightness TH, a case in which a lighting environment is changed during photographing, or the like. In such a case, the third gradation correction processing of FIG. 9 is applicable.

The feature amount HL detected in step S302 of FIG. 9 becomes larger than the target brightness TH. In step S903, the image processing unit 108 calculates a target brightness level according to HL+β×(TH−HL). Since the feature amount HL is larger than the target brightness TH, the target brightness level becomes smaller than the feature amount HL.

Figure 12:
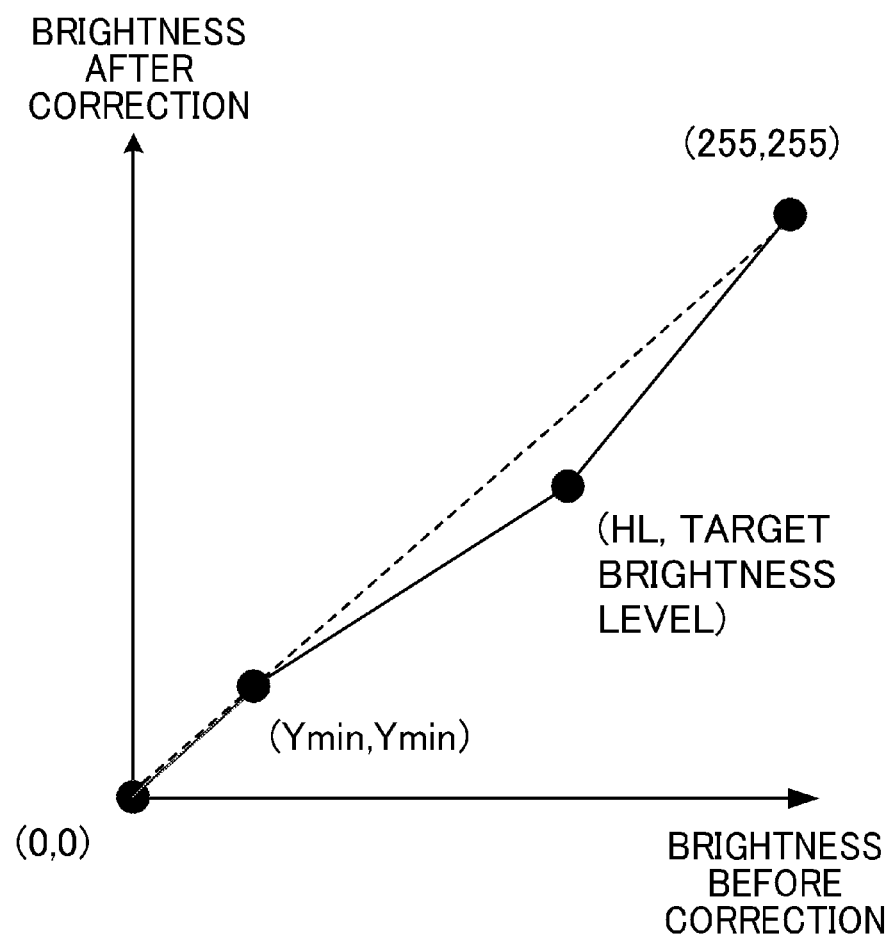
FIG. 12 is a graph showing an example of a tone curve in a case in which a feature amount HL is larger than target brightness TH.

FIG. 12 shows an example of a tone curve in a case in which a feature amount HL is larger than target brightness TH. In a tone curve determined in step S304, an apex (HL, target brightness level) is positioned below a line connecting an apex (Ymin, Ymin) and an apex (255, 255) to each other as shown in FIG. 12. Accordingly, gradation correction in S305 of FIG. 9 is correction for decreasing brightness, and the brightness of a high-brightness region after the gradation correction consequently comes close to the target brightness TH.

According to the above first to third gradation correction methods, the digital camera 100 is enabled to provide gradation correction for the brightness of a high-brightness region so that the brightness of an image as intended by the user is obtained when the user changes the target brightness TH of the high-brightness region in the highlight-weighted photometry mode.

The present invention is described in detail above on the basis of the preferred embodiments. However, the present invention is not limited to these specific embodiments but includes various modes without departing from its gist. Some of the embodiments described above may be appropriately combined together.

According to the present disclosure, it is possible to appropriately correct the gradation of the brightness of a high-brightness region.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-073105, filed on Apr. 27, 2022, which is hereby incorporated by reference herein in its entirety.

What is claimed is:

1. An imaging device comprising:
  a processor; and
  a memory storing a program which, when executed by the processor, causes the imaging device to:
  (1) execute setting processing of setting a target brightness level of a high-brightness region in an imaging scene;
  (2) execute exposure control processing of performing photometry to control exposure; and
  (3) execute gradation correction processing of performing predetermined gradation correction on an image obtained by imaging,
  wherein a mode for controlling the exposure includes (a) a first photometry mode, in which photometry is performed using the high-brightness region as a photometry region and exposure is controlled on a basis of a target brightness level set in the setting processing, and (b) a second photometry mode different from the first photometry mode,
  wherein in the gradation correction processing, a representative brightness representing brightness of the high-brightness region is detected and the predetermined gradation correction is performed so that the representative brightness comes close to the target brightness level to suppress the predetermined gradation correction more in a case in which the image is obtained by imaging using the first photometry mode than in a case in which the image is obtained by imaging using the second photometry mode,
  wherein the representative brightness is a brightness at which pixels with a cumulative frequency of a predetermined ratio from a high-brightness side or a low-brightness side in a brightness histogram of the image are contained, and
  wherein the brightness histogram is generated from a region excluding a periphery of the image.

2. The imaging device according to claim 1, wherein in the gradation correction processing, the predetermined gradation correction is invalidated in the first photometry mode.

3. The imaging device according to claim 2, wherein in the gradation correction processing, the predetermined gradation correction is invalidated by changing a tone curve used in the predetermined gradation correction to a line-type tone curve in the first photometry mode.

4. The imaging device according to claim 1, wherein in the setting processing, target brightness, which is selected by a user, is set as the target brightness level.

5. The imaging device according to claim 4, wherein the program, when executed by the processor, further causes the imaging device to execute presentation processing of presenting a plurality of candidates for target brightness selectable by the user.

6. The imaging device according to claim 1, wherein the predetermined ratio is at least 1% and not more than 10%.

7. The imaging device according to claim 1, wherein the predetermined ratio is controlled to be increased as ISO sensitivity increases.

8. The imaging device according to claim 1, wherein in the setting processing, a value between a predetermined brightness and the representative brightness is set as the target brightness level.

9. The imaging device according to claim 1, wherein in the setting processing, the target brightness level is set on a basis of the representative brightness and target brightness selected by a user.

10. The imaging device according to claim 1, wherein the target brightness level is an upper-limit threshold of the brightness of the high-brightness region, and
  wherein in the gradation correction processing, the predetermined gradation correction is performed so that the brightness of the high-brightness region does not exceed the upper-limit threshold in the first photometry mode.

11. The imaging device according to claim 1, wherein the target brightness level is a target value of the brightness of the high-brightness region, and
  wherein in the gradation correction processing, the predetermined gradation correction is performed so that the brightness of the high-brightness region comes close to the target value in the first photometry mode.

12. The imaging device according to claim 1, wherein the high-brightness region is a region having brightness of at least a predetermined threshold.

13. A method for controlling an imaging device, the method comprising:
  setting a target brightness level of a high-brightness region in an imaging scene;
  performing photometry to control exposure; and
  performing predetermined gradation correction on an image obtained by imaging,
  wherein a mode for controlling the exposure includes (a) a first photometry mode, in which photometry is performed using the high-brightness region as a photometry region and exposure is controlled on a basis of a target brightness level that has been set in the setting, and (b) a second photometry mode different from the first photometry mode, wherein a representative brightness representing brightness of the high-brightness region is detected and the predetermined gradation correction is performed so that the representative brightness comes close to the target brightness level to suppress the predetermined gradation correction more in a case in which the image is obtained by imaging using the first photometry mode than in a case in which the image is obtained by imaging using the second photometry mode, wherein the representative brightness is a brightness at which pixels with a cumulative frequency of a predetermined ratio from a high-brightness side or a low-brightness side in a brightness histogram of the image are contained, and wherein the brightness histogram is generated from a region excluding a periphery of the image.

14. A non-transitory computer-readable storage medium storing a program for causing a computer to execute a method for controlling an imaging device, the method comprising:

setting a target brightness level of a high-brightness region in an imaging scene;

performing photometry to control exposure; and performing predetermined gradation correction on an image obtained by imaging, wherein a mode for controlling the exposure includes (a) a first photometry mode, in which photometry is performed using the high-brightness region as a photometry region and exposure is controlled on a basis of a target brightness level that has been set in the setting, and (b) a second photometry mode different from the first photometry mode, wherein a representative brightness representing brightness of the high-brightness region is detected and the predetermined gradation correction is performed so that the representative brightness comes close to the target brightness level to suppress the predetermined gradation correction is suppressed more in a case in which the image is obtained by imaging using the first photometry mode than in a case in which the image is obtained by imaging using the second photometry mode, wherein the representative brightness is a brightness at which pixels with a cumulative frequency of a predetermined ratio from a high-brightness side or a low-brightness side in a brightness histogram of the image are contained, and wherein the brightness histogram is generated from a region excluding a periphery of the image.

15. The imaging device according to claim 1, wherein the high-brightness region is a region having brightness with a cumulative frequency of not more than a predetermined ratio from a high-brightness side in a brightness histogram.

* * * * *